May 14, 1935.  H. A. W. KLINKHAMER  2,001,465

TRANSFORMER FOR THE CONVERSION OF POLYPHASE CURRENTS

Filed April 20, 1934

Inventor:
H. A. W. Klinkhamer,
by C. F. Wendroth
Atty.

Patented May 14, 1935

2,001,465

UNITED STATES PATENT OFFICE 2,001,465

TRANSFORMER FOR THE CONVERSION OF POLYPHASE CURRENTS

Hendrik Abraham Wijnand Klinkhamer, Eindhoven, Netherlands, assignor to N. V. Philips' Gloeilampenfabrieken, Eindhoven, Netherlands Application April 20, 1934, Serial No. 721,636 In The Netherlands May 17, 1933

3 Claims. (Cl. 172—238)

This invention relates to transformers for converting three-phase alternating currents into two or four-phase currents or vice versa.

For such conversion the so-called "Scott connection" is generally used. A transformer using this connection, frequently consists of two single-phase transformers, the ratio of the turns of the primary windings of which is $$1 : \tfrac{1}{2}\sqrt{3}$$

Of these two primary windings one is provided with a mid-tap, which is connected to one end of the secondary winding; the two ends of the first winding and the free end of the second winding being connected to the three-phase network.

The secondary windings of the transformers can be connected in various known manners.

The present invention relates to a novel arrangement and dimensioning of the primary windings of such a transformer, which make it possible that, by a simple change of connections, the transformer can be used for two different supply voltages.

According to my invention each of the two primary windings of the transformer is subdivided into a plurality of individual coils or sections, more specifically one of the windings being divided into two equal coils and the second winding into three coils, two of which are equal. Furthermore, the ratio of the number of turns of the above five coils is equal or approximately equal to $$1 : 1 : \tfrac{1}{4}\sqrt{3} : \tfrac{1}{4}\sqrt{3} : \tfrac{1}{2}\sqrt{3}$$

In this arrangement the first and the second coils may be connected permanently in series with the third and fourth coils respectively, whereas the ends of the fifth coil and the free ends of the first four coils may be fixedly connected to six terminals.

The invention will be more clearly understood by reference to the accompanying drawing, in which Figure 1 is a schematic diagram of a transformer assembly and its primary windings embodying my invention.

Figure 1:
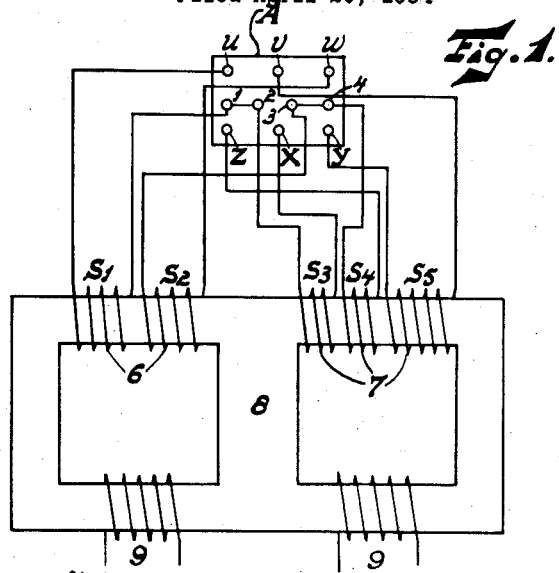

Referring to Figure 1, the transformer assembly comprises two single-phase transformers having a common yoke 8 and secondary windings 9—9. It should be, however, well understood that two individual single-phase transformers can also be used.

The primary winding 6 consists of two individual coils or sections, $s_1$ and $s_2$, these coils having an equal number of turns. A suitable terminal connecting-board or junction-box A is provided, which is shown to comprise three rows of terminals marked $u, v, w$; $1, 2, 3, 4$ and $z, x, y$. The ends of the coil $s$—$1$ are connected to the terminals $u$ and $1$ and the ends of coil $s_2$ are connected to the terminals $3$ and $w$, respectively.

The second primary winding, marked 7, consists of three individual coils $s_3, s_4$ and $s_5$. The coils $s_3$ and $s_4$ have an equal number of turns, whereas the coil $s_5$ has twice the number of turns of the coil $s_3$ or $s_4$, the ratio of the number of turns of the five coils is $$s_1 : s_2 : s_3 : s_4 : s_5 = 1 : 1 : \tfrac{1}{4}\sqrt{3} : \tfrac{1}{4}\sqrt{3} : \tfrac{1}{2}\sqrt{3}$$

The free ends of the coil $s$—$3$ are connected to the terminal points $2$ and $x$, and the ends of the coil $s_4$ are connected to the terminal points $4$ and $z$, and the ends of coil $s_5$ are connected to the terminals $y$ and $v$.

Figure 2:
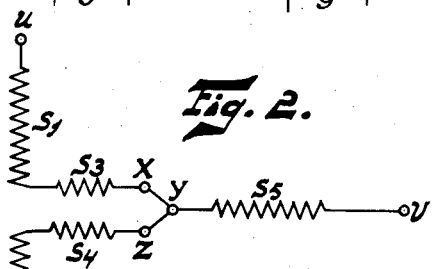
Fig. 2 is a connection diagram showing one mode of connection of the individual coils of the transformer assembly of Figure 1.
Figure 3:
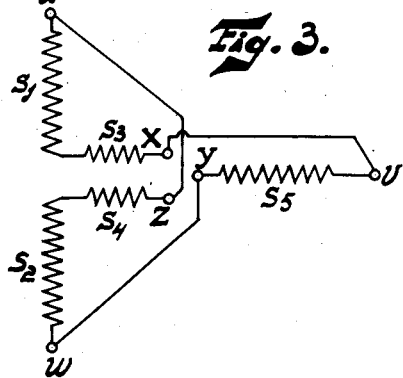
Fig. 3 is a connection diagram showing a second mode of connection of the individual coils of the transformer assembly of Fig. 1 to adapt it for a different net voltage.

As stated above, the transformer illustrated in Figure 1 can be conveniently connected in two different ways, these being illustrated in Figs. 2 and 3. The relation between the two connections is such that the same output voltage is obtained for both connections if the input voltage used in the connection of Fig. 3 is $$\frac{1}{\sqrt{3}}$$

of the input voltage used with the connection of Fig. 2; or by using with both cases the same input voltage, the output voltage in the connection of Fig. 2 is $$\frac{1}{\sqrt{3}}$$

of the output voltage obtained with the connection of Fig. 3.

The last said possibility however will be in most cases less desirable as the magnetic conditions in the core would be uneconomical.

The terminals $1$—$2$, and $3$—$4$ are interconnected in both figures, and these connections therefore can be made permanent.

In the connection of Fig. 2, which is substantially a star connection, the terminals $x, y$ and $z$ are interconnected, and the terminals $u, v$ and $w$ are connected to the three phases of the network.

In the connection of Fig. 3 the terminal $u$ is connected to $z$, the terminal $x$ is connected to $v$, and the terminal $y$ is connected to $w$, which results substantially in a delta connection. The three phases of the network are again connected to the terminals $u$, $v$ and $w$.

It will thus appear that in accordance with my invention it is possible to use a single arrangement for the transformation of three-phase current to either a two- or four-phase current for two different input voltages and the same output voltage, and to change from one connection to the other it is merely required to change the connections of terminals $x$, $y$ and $z$.

While in the foregoing it is the ratio of the number of turns which is referred to, it is of course to be understood that this more fundamentally indicates the ratio of the induced voltages of the coils. The more specialized transformer equation which is chiefly used, and from which the term "ratio of number of turns" is derived is as follows:

$$\frac{E_2}{E_1} = \frac{n_2}{n_1}$$

This assumes a constant flux density, and constant cross section of the magnetic circuit. However, the more fundamental equation providing for taking into account variations in either the flux density and cross section of the magnetic circuit is as follows:

$$\frac{E_2}{E_1} = \frac{n_2 B_2 A_2}{n_1 B_1 A_1}$$

where of course $A_1$ and $A_2$ represent the cross-sectional area and $B_1$ and $B_2$ the magnetic flux density, of the magnetic circuit corresponding to primary and secondary windings respectively.

While I have described my invention in connection with a specific embodiment, I do not wish to be limited thereto, but desire the appended claims to be construed as broadly as permissible in view of the prior art.

What I claim is:

1. A transformer assembly to convert polyphase currents in accordance with the "Scott connection", said assembly comprising at least two windings, the first winding being divided into two individual sections and the second winding into three individual sections, the ratio of the induced voltages of the five sections being approximately:

$$1:1:\tfrac{1}{2}\sqrt{3}:\tfrac{1}{2}\sqrt{3}:\tfrac{2}{3}\sqrt{3}$$

2. A transformer assembly to convert polyphase currents in accordance with the "Scott connection", said assembly comprising two primary windings, the first of said primary windings having two individual coils and the second winding having three individual coils, the ratio of the induced voltages of said five coils being approximately equal to $$1:1:\tfrac{1}{2}\sqrt{3}:\tfrac{1}{2}\sqrt{3}:\tfrac{2}{3}\sqrt{3}$$

each coil of said first primary winding being series-connected with one of those two coils of the second winding which have the same induced voltage, terminals for the free ends of the five coils, and removable connecting means for the alternate connection of said coils into a starlike and a deltalike connection.

3. A transformer assembly to convert polyphase currents in accordance with the "Scott connection", said assembly comprising two primary windings, the first of said primary windings having two sections and the second windings having three sections, the ratio of the induced voltages of said five sections being approximately equal to $$1:1:\tfrac{1}{2}\sqrt{3}:\tfrac{1}{2}\sqrt{3}:\tfrac{2}{3}\sqrt{3}$$

each section of said first primary winding being series-connected with one of those two sections of said second winding which have an equal induced voltage, and the free ends of the five coils being connected to six terminals, and means for the alternate interconnection of said terminals to obtain two connections of said sections, both of which provide the same output voltage but at different input voltages, the ratio of said input voltages being $$1:\frac{1}{\sqrt{3}}$$

HENDRIK ABRAHAM
WIJNAND KLINKHAMER.